(12) United States Patent
Cruz Domínguez et al.

(10) Patent No.: US 9,463,866 B2
(45) Date of Patent: Oct. 11, 2016

(54) COMPOSITE STRUCTURE FOR AN AIRCRAFT AND MANUFACTURING METHOD THEREOF

(71) Applicant: Airbus Operations, S.L., Getafe (ES)

(72) Inventors: Francisco José Cruz Domínguez, Getafe (ES); Carlos García Nieto, Getafe (ES); Francisco Javier Honorato Ruiz, Getafe (ES)

(73) Assignee: AIRBUS OPERATIONS S.L., Madrid (ES)

( * ) Notice: Subject to any disclaimer, the term of this patent is extended or adjusted under 35 U.S.C. 154(b) by 217 days.

(21) Appl. No.: 14/266,133

(22) Filed: Apr. 30, 2014

(65) Prior Publication Data

US 2015/0353181 A1    Dec. 10, 2015

(30) Foreign Application Priority Data

Apr. 30, 2013 (EP) ..................... 13165885

(51) Int. Cl.
*B64C 1/00* (2006.01)
*B64C 1/12* (2006.01)
*B29D 99/00* (2010.01)
*B64C 1/06* (2006.01)

(52) U.S. Cl.
CPC ............. *B64C 1/12* (2013.01); *B29D 99/0007* (2013.01); *B29D 99/0014* (2013.01); *B64C 1/064* (2013.01); *B64C 2001/0072* (2013.01); *Y02T 50/433* (2013.01)

(58) Field of Classification Search
USPC ......... 244/119, 131, 120, 132, 2, 123.1, 124
See application file for complete search history.

(56) References Cited

U.S. PATENT DOCUMENTS

| | | | |
|---|---|---|---|
| 2,696,451 A * | 12/1954 | Snyder ..................... | B60J 10/00 244/129.3 |
| 4,606,961 A | 8/1986 | Munsen et al. | |
| 5,518,208 A * | 5/1996 | Roseburg ................ | B64C 1/064 244/119 |
| 5,845,872 A * | 12/1998 | Pridham ................ | B64D 45/02 244/1 A |
| 7,202,321 B2 * | 4/2007 | Byrd ...................... | C08G 18/61 428/447 |
| 7,682,682 B2 * | 3/2010 | Leon-Dufour ........... | B64C 1/12 244/117 R |

(Continued)

FOREIGN PATENT DOCUMENTS

| | | |
|---|---|---|
| WO | 1 566 334 | 8/2005 |
| WO | WO 2011/003844 | 1/2011 |
| WO | WO 2012/042246 | 4/2012 |

OTHER PUBLICATIONS

European Search Report for Application No. 13165885.8 dated Oct. 11, 2013.

*Primary Examiner* — Christopher P Ellis
(74) *Attorney, Agent, or Firm* — Jenkins, Wilson, Taylor & Hunt, P.A.

(57) ABSTRACT

The invention refers to a composite structure for an aircraft comprising a panel and at least one stringer joined to a surface of the skin panel, the stringer having a foot and a web protruding from the foot, and a run-out section at one of its ends. The panel includes a plurality of stacked and co-cured plies of composite material, and at least part of the foot of the stringer at the run-out section, is inserted between two plies of the panel, and it is co-bonded, co-cured or secondary bonded with said two plies. The structure of the invention provides a reinforced join between the foot of the stringer and the skin panel, avoiding peeling or de-bonding problems, without substantially modifying the manufacturing process.

14 Claims, 9 Drawing Sheets

(56) References Cited

U.S. PATENT DOCUMENTS

| | | | |
|---|---|---|---|
| 7,823,362 B2* | 11/2010 | Meyer | B64C 1/064 244/120 |
| 8,215,584 B2* | 7/2012 | Cazeneuve | B64C 1/064 244/119 |
| 8,220,745 B2* | 7/2012 | Tacke | B64C 1/069 244/131 |
| 8,353,479 B2* | 1/2013 | Tacke | B64C 1/061 244/119 |
| 8,444,090 B2* | 5/2013 | Reye | B64C 1/06 244/119 |
| 8,715,808 B2* | 5/2014 | Roming | B64C 1/064 244/131 |
| 8,960,606 B2* | 2/2015 | Diep | B64C 1/12 244/131 |
| 9,187,167 B2* | 11/2015 | Sauermann | B29B 13/025 |
| 9,242,715 B2* | 1/2016 | Cosentino | B64C 1/12 |
| 2010/0127122 A1* | 5/2010 | Cosentino | B29D 99/0014 244/117 R |
| 2012/0100343 A1 | 4/2012 | Borghini-Lilli et al. | |
| 2012/0104170 A1* | 5/2012 | Gallant | B64C 1/061 244/132 |
| 2012/0234978 A1* | 9/2012 | Hernando Navas | B64C 3/061 244/132 |
| 2013/0101801 A1 | 4/2013 | Honorato Ruiz et al. | |
| 2013/0164489 A1* | 6/2013 | Gaitonde | B64C 3/182 428/99 |
| 2013/0313391 A1* | 11/2013 | Fonseka | B64C 1/064 248/228.1 |

* cited by examiner

PRIOR-ART

COMPOSITE STRUCTURE FOR AN AIRCRAFT AND MANUFACTURING METHOD THEREOF

TECHNICAL FIELD

The present invention refers in general to composite structures for the manufacture of aircraft structural components, such as stringers, torsion boxes, skin panels, wing surfaces, horizontal tail or vertical stabilizers (HTP & VTP), etc.

More in particular, it is an object of the present invention to provide an optimized technique for transferring load between a stringer and a skin panel at the run-out section of the stringer, avoiding de-bonding problems (due to shear and peeling effects) at the stringer run-out section.

The invention also refers to a method for manufacturing such a composite structure.

BACKGROUND

The use of composite materials formed by an organic matrix and unidirectionally orientated fibres, such as Carbon Fibre Reinforced Plastic (CFRP), in the manufacture of structural components of an aircraft, for example fuselage skin panels, torsion boxes, stringers, ribs, spars etc., is well known in the aeronautical industry.

Typically, skin panels are stiffened by several stringers longitudinally arranged, in order to provide strength and guarantee a proper buckling behavior of the skin panels. The stringers are conventionally co-cured, co-bonded, secondarily bonded or bolted to the skin panel. FIG. 1 shows a conventional design of a stringer (3) bonded to a skin panel (1).

At the ends of the stringer (3), the stringer load is transferred to the skin panel (1), so that a redistribution of loads is originated at the stringer terminations, which causes well known de-bonding problems (due to peeling and shear effects) between the stringer (3) and the skin panel (1). In order to reduce the stress concentration at the stringer termination and mitigate the associated problems, stiffeners are conventionally manufactured with the so called stringer "run-out" section (5) at the ends which contributes to improve the load transfer from the stringer (3) into the panel (1) reducing the stress concentration at the end of the stringer (3).

At the run-out section (5), the cross-section of the stringer (3) is progressively reduced towards the end by reducing the height and/or thickness of the stringer (3), so as to progressively reduce the load supported by the stringer (3) at the run-out (5). Therefore, a conventional stringer (3) design has a tapered termination (6).

U.S. Pat. No. 4,606,961, and US patent applications US-2005/0211846 and US-2012/0100343, are examples of these techniques.

In addition to the use of stringers with tapered web at the run-out, other approaches (to guarantee proper load transference at this structural detail) are known, which are based on the use of additional components such as metallic brackets or bolts. U.S patent application US-2012/0234978A1, and PCT publication WO2012/042246A2, are examples of that type of solution.

Despite the fact that the above-mentioned solutions satisfactorily enhance the strength of the union between stringer and panel, those solutions are affected by the drawback that the manufacturing process becomes more complex and in most of the cases, more expensive, since it is necessary to manufacture an additional component (the metallic insert or bracket), which has to be subsequently fitted, for example bolted, to the skin panel.

Due to the before-mentioned problem and taking into account the need for structural solutions that provide integration, the need in the manufacture of composite structures for improved solutions which, assuring the strength of the union between stringer and panel to avoid de-bonding problems, do not require the provision of additional components or substantial modifications of the manufacturing process has been detected.

SUMMARY

One aspect of the present invention refers to a structure of composite material for an aircraft, wherein the structure comprises a panel, for example a skin panel, and at least one stringer joined to the panel to reinforce the same. The stringer has a foot and a web protruding from the foot, and a run-out section at one of its ends for reducing local stress concentrations. The panel is formed of, or includes a stack of plies of composite material, and the stringer is co-cured, co-bonded or secondarily bonded to the panel.

According to the invention, at least part of the foot of the stringer at its run-out section is inserted between some of the plies of the panel, and that part of the foot is directly joined with said plies, preferably by co-bonding co-curing, or secondary bonding the foot with said plies. Therefore, a part of the foot at the run-out section, preferably a major part of it, is integrated inside the panel by arranging the foot, during the manufacturing process, between some plies forming part of the skin panel. Due to this integrated arrangement of the stringer's foot, the strength of the joint between the stringer run-out and the skin is significantly enhanced.

Traditionally in prior art techniques, only the lower surface of the stringer foot is used as a union interface with the plies of the panel, as shown in FIG. 1 for example. However in the present invention, also the upper surface of the foot at the stringer run-out is used as union interface with the panel. The technical effect or advantage of this assembly, is that the total interface area between the stringer and the panel, and therefore the strength of the joint and the load transfer, are significantly enlarged, without incorporating additional components, and without increasing the cost of the manufacturing process.

Some of the plies of the skin panel are applied on a major part of the upper surface of the foot at the run-out section so that that part of the foot is embedded, inserted or sandwiched between upper and lower plies of the panel, thus, a part of the foot becomes an integral part of the panel. These plies of the panel are co-cured, co-bonded or secondarily bonded to that part of the foot inserted between them.

For covering the foot of several stringers of a structure, plies can be used in common for covering some or all of them. Alternatively, individual plies can also be used for covering the foot of each stringer.

Another aspect of the invention refers to a method for manufacturing a composite structure for an aircraft, comprising the steps of providing at least one stringer having a foot and a web protruding from the foot, and a run-out section at one of its ends. In the method of the invention, a panel is formed by laying up a plurality of plies of composite material. One or more stringers are placed on one of the plies layed-up previously to form the panel. Once the stringer is placed on the stack of plies, at least one more ply and preferably a plurality of plies, are applied or layed-up on the panel and are also applied on a major part of the upper surface of the foot at the run-out section of the stringer, so that said part of the foot is sandwiched between some plies of the panel.

The method of the invention provides several alternatives for obtaining such an integrated arrangement of the stringer foot and skin panel, in that the foot can be co-bonded, co-cured, or secondarily bonded with some plies of the skin panel.

The structure and method of the invention provides a reinforced joint between the foot of the stringer and the skin panel, avoiding or at least reducing de-bonding problems (due to shear and peeling effects). The manufacturing process is basically the same as known processes, since it is only necessary to lay-up plies on top and in the area of the stringer foot, which only requires modifying the sequence of the lay-up process, but there is no need to provide additional components or modifying the existing tooling.

BRIEF DESCRIPTION OF THE DRAWINGS

Preferred embodiments of the invention, are henceforth described with reference to the accompanying drawings, wherein.

DETAILED DESCRIPTION

Figure 1:
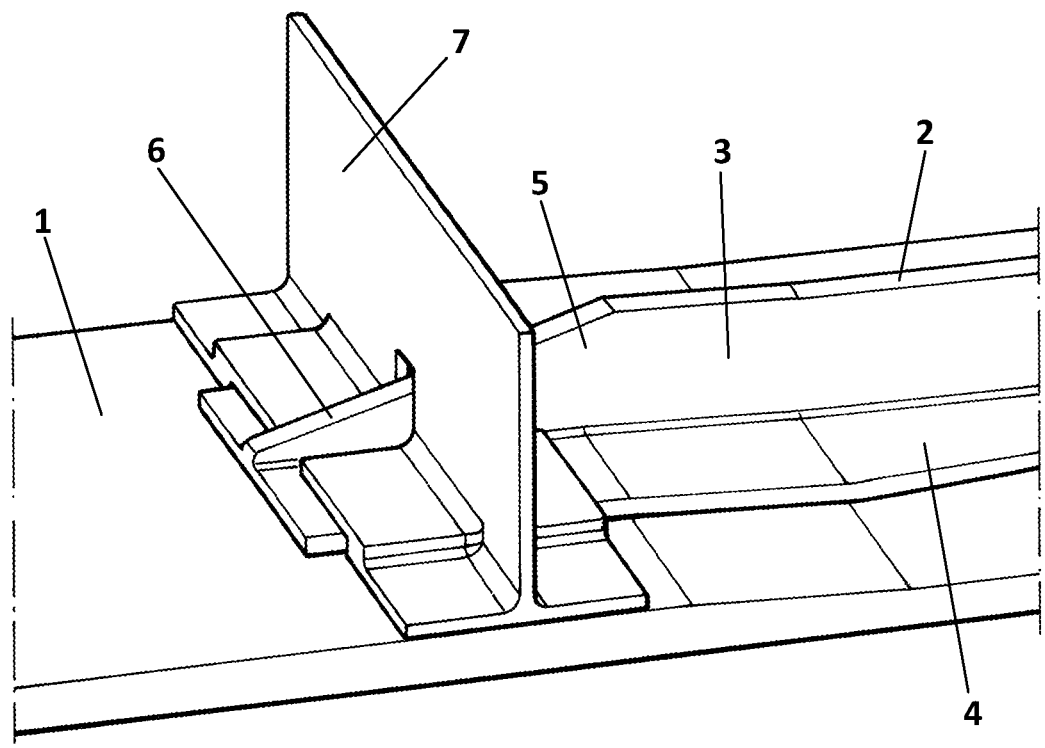
FIG. 1 shows a perspective view of a conventional design of a stringer run-out section of the prior art.
Figure 2A:
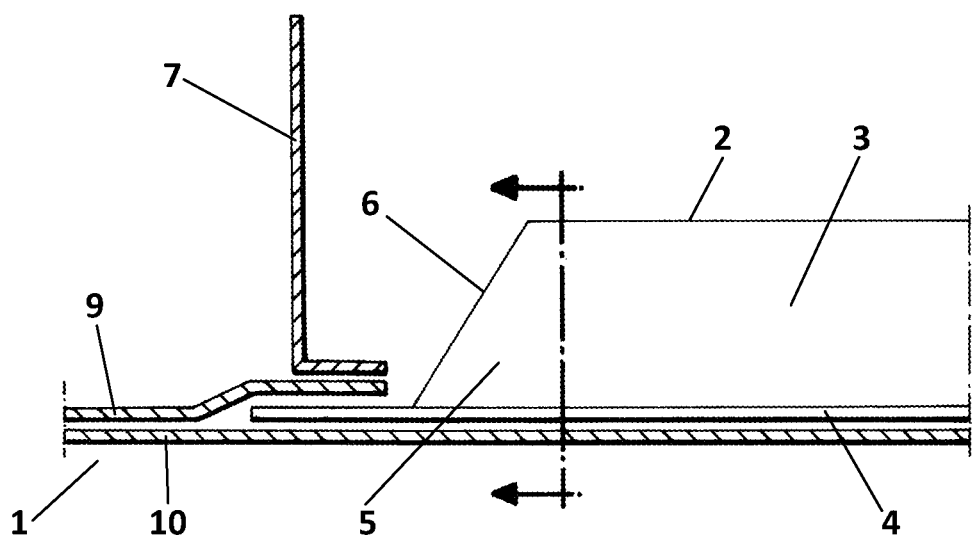
FIGS. 2A and 2B show two schematic representations of a composite structure according to the invention, wherein the stringer foot (4) is inserted between two consecutive plies (9,10) of the skin panel (1). Only the two plies involved (9,10) (upper and lower plies with respect to the stringer foot) are represented for the sake of simplicity of the illustration, however it would be clear for the skilled person that the panel (1) is formed by a plurality of stacked plies, above and below the stringer foot (4). In drawing 2A a discontinuous line indicates the run-out section (5), which extends from the tapered web (6) to the distal end of the stringer (3). Drawing 2B is an enlarged view of the stringer foot integrated within the panel.

FIG. 2A schematically shows a portion of a structure for an aircraft made of composite materials such as CFRP, which may be used for example for manufacturing a skin panel of an aircraft fuselage, wings, torsion boxes, horizontal stabilizers, etc.

Figure 2B:
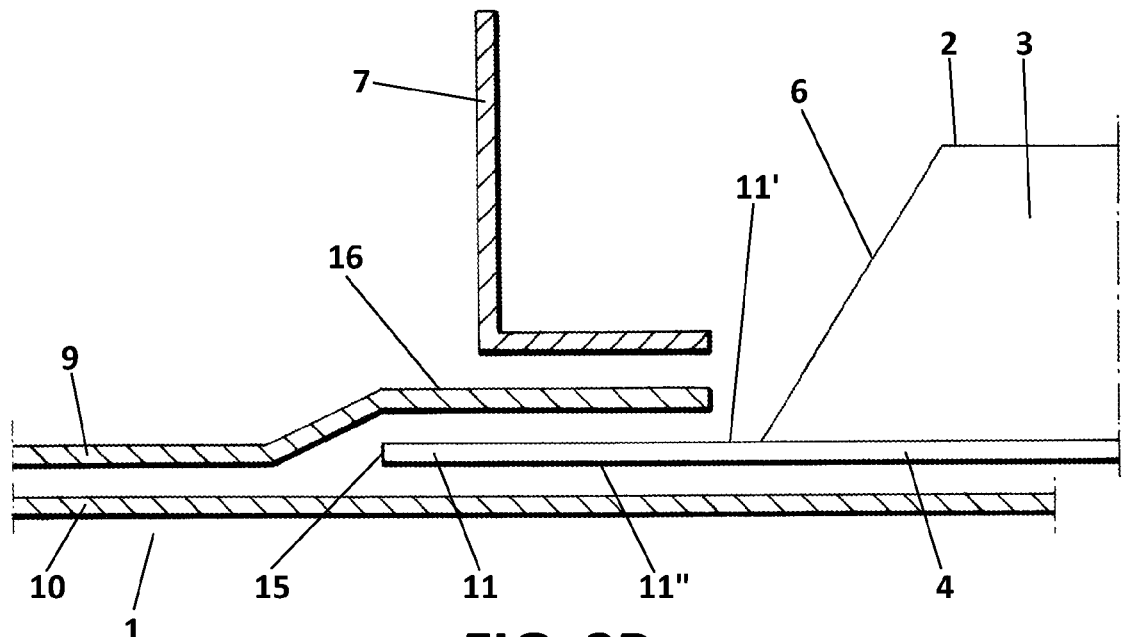

The structure comprises a skin panel (1) and at least one stringer (3) joined to a surface of the panel (1), wherein the stringer (3) has a T-shaped cross-section, and has a foot (4) and a web (2) protruding from the foot (4). Alternatively, the stringer may have another cross-section shape, such as "I", "L", "U", "C", "Ω" etc. The stringer (3) has a run-out section (5) at one of its ends, with a tapered termination (6) in order to reduce local stress concentrations in a known manner. The panel (1) includes or is formed by a plurality of stacked plies of composite material As it can be appreciated more clearly in view of FIG. 2B, the structure of the invention provides that at least part of the foot (4) of the stringer (3) at its run-out section (5), is inserted between some plies of the panel (1), in particular between upper and lower plies (9,10) of the panel, so that, a major part of the foot (4) is sandwiched, embedded or inserted between these upper and lower plies (9,10) which form part of the panel (1). In FIG. 2B, it can be observed that the foot (4) of the stringer (3), rests on a lower ply (10), whereas part of an upper ply (9) of the panel (1) is applied directly on a major part of the upper surface (11') of the foot (4) of the stringer (3).

Preferably, and in order to enlarge the contact area between the foot (4) and the plies of the panel (1), the foot (4) is provided with an extended foot (11), which is an extension of the foot (4) beyond the web (2) at the distal end of the stringer, that is, the web (2) does not extend along said extended foot (11). A major part of the extended foot (11) is inserted between upper and lower plies (9,10) of the panel (1), so that the foot (4) rests on the lower ply (10) of the panel (1) and the lower surface (11") of the foot is in direct contact with said ply (10). A consecutive or adjacent ply, in particular the upper ply (9) of the stack of plies, is placed directly on part of the lower ply (10) and also on the upper surface (11') of the extended foot (11), so that part of the upper ply (9) overlaps the extended foot (11).

In a preferred embodiment of the invention, as the one shown in FIG. 2B, the structure includes a rib (7) joined to the panel (1) and to the foot (4) of the stringer at its run-out section (5), right over the part of the ply (9) overlapping the extended foot (11). The rib (7) is arranged transversally to the longitudinal axis of the stringer (3), and it is conventionally fixed to the panel and stringer for example by bolts (not-shown). The rib (7) joined to the part of the foot integrated in the panel, contributes to further reinforce the joint of the stringer's foot with the panel and to mitigate the out of plane peeling effects.

Alternatively, the rib (7) may be co-cured, co-bonded, or secondarily bonded with the stringer foot (4) and the panel (1) plies.

Despite the fact that only a few plies have been represented in the figures, it is to be understood that preferred embodiments of the invention, include panels (1) formed by a plurality of stacked plies underneath the foot of the stringer, as well as a plurality of plies over said foot at its run-out section. In this sense, FIG. 3 represents how two or more upper plies (8,9) are arranged over the foot at the run-out section, and two or more lower plies (10,14) are arranged below the foot at the run-out section.

Figure 3:
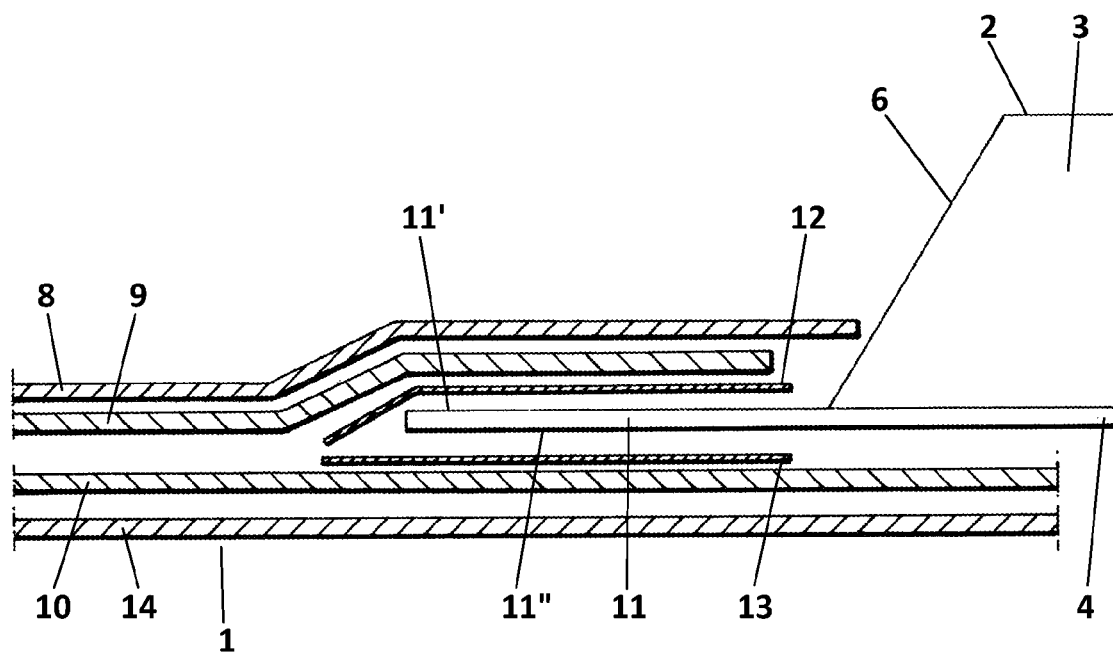
FIG. 3 shows a similar representation to FIGS. 2A and 2B, wherein the interfaces originated between upper and lower surfaces of the stringer foot (4) and the panel (1) are illustrated. The interface areas (12,13) between the foot (4) and the panel (1), are represented schematically by continuous lines.

Additionally, FIG. 3 shows how according to the invention, two large interface areas (12,13) (contact areas) are created between the foot (4) and plies (9,10) of the panel, which are in direct contact with the upper and lower surfaces (11",11") of the stringer foot, so that the strength of the bonding between the stringer (3) and the panel (1) is substantially enhanced with respect to prior art arrangements with only one interface area.

Figure 4:
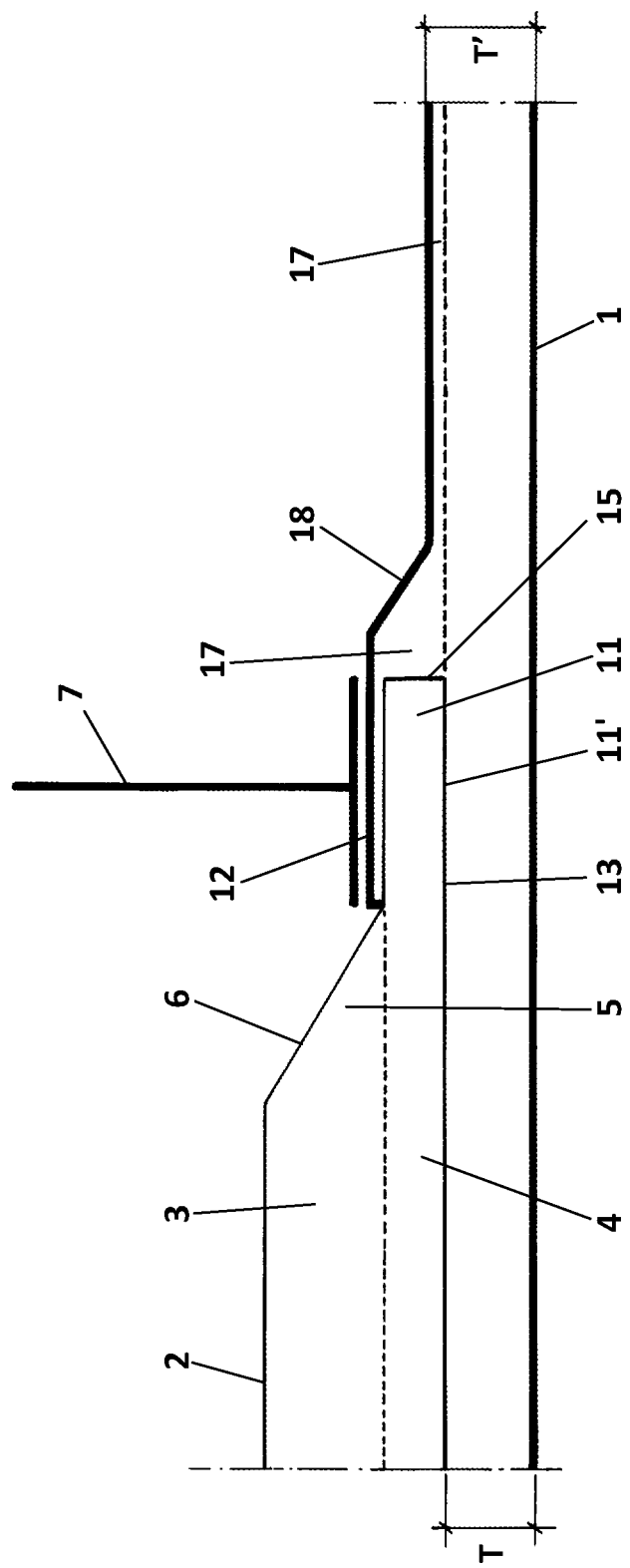
FIG. 4 shows another schematic representation of an alternative embodiment of the invention.

FIG. 4 shows a stack of upper plies (17) overlapping with the extended foot (11) and with the panel (1). The extended foot (11) has a constant thickness, for that, a step (18) is formed in said stack of upper plies (17) over the distal end (15) of the extended foot (11).

Figure 5:
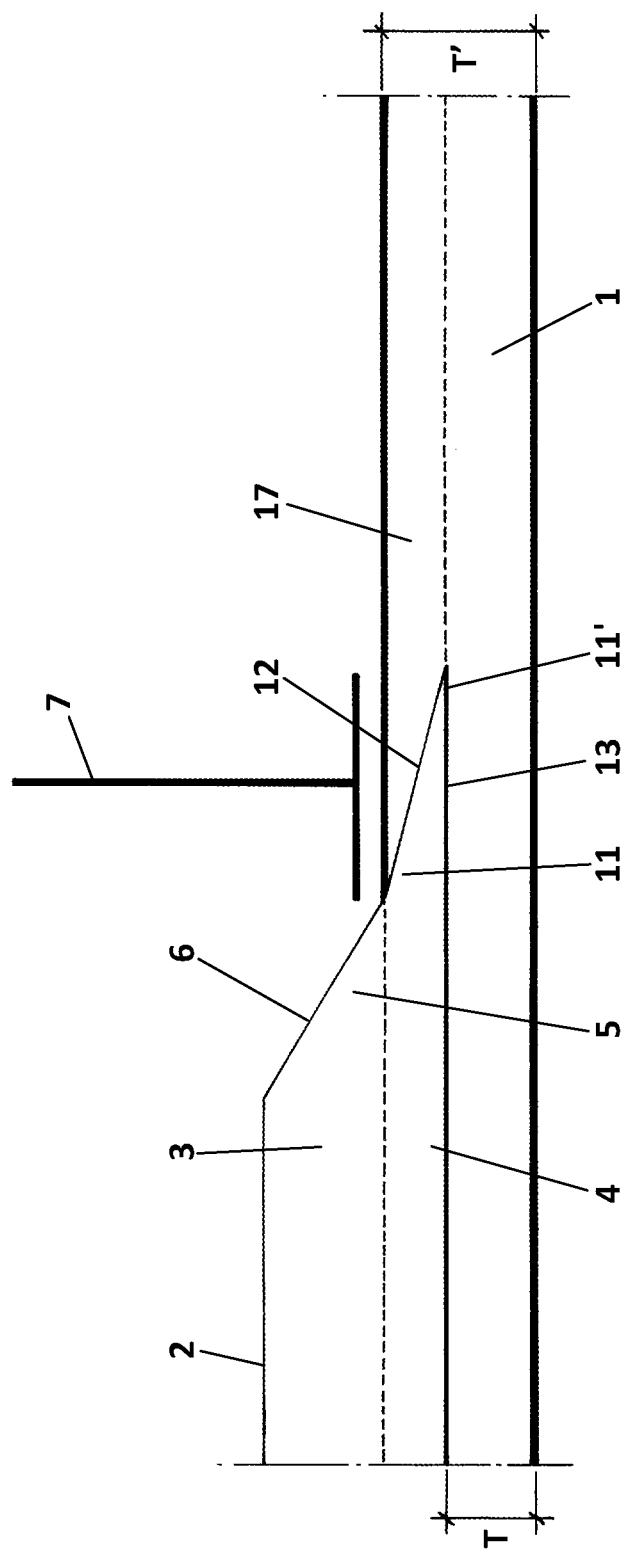
FIG. 5 shows another schematic representation of an alternative embodiment of the invention.

In the preferred embodiment of FIG. 5, the extended foot (11) has the shape of a ramp having a triangular cross-section, which forms a sloped portion or surface. That sloped configuration of the extended foot (11), is obtained for example by progressively dropping plies of the panel (1), in such a manner that the thickness of the extended foot (11) is progressively reduced towards the distal end (15) as shown in FIG. 5. The stack of upper plies (17) overlaps with the extended foot (11), so that, a sloped upper interface area (12) is defined therein, which has a softer profile compared for example with the interface area (12) of the embodiment of FIG. 4. This arrangement has the advantage and technical effect, that it is assured that after the curing process, the plies are compacted properly at the overlapping area, and porosity problems are avoided or at least significantly reduced.

As it can be appreciated in the embodiments of FIGS. 4 and 5, the panel (1) thickness is constant in an inner section of the same right below the stringer (3), whereas an outer section of the panel where the upper plies (17) overlap the panel (1) after the stringer run out section (5), is thicker than said inner section of the panel located below the stringer, that is (T''>T).

Alternatively, in the embodiments of FIGS. 6 and 7, the panel (1) has a section with a reduced thickness (18) located after the stringer run out (5), so that once the overlapping upper plies (17) are placed on top of the stringer extended foot (11), the thickness of the panel (1) in that outer section, is equal to the thickness of the panel (1) in the inner section right below the stringer run out and its extended foot, that is (T1=T1''). The thickness reduction (H) of the skin panel (1) due to the reduced thickness section (18), is therefore equal to the thickness of the stack of overlapping upper plies (17). The reduced thickness section (18) of the panel (1), compensates the increase of weight due to the stack of upper plies (17), thus, despite the addition of the stack of upper plies (17), the overall weight of the skin is not increased.

Figure 6:
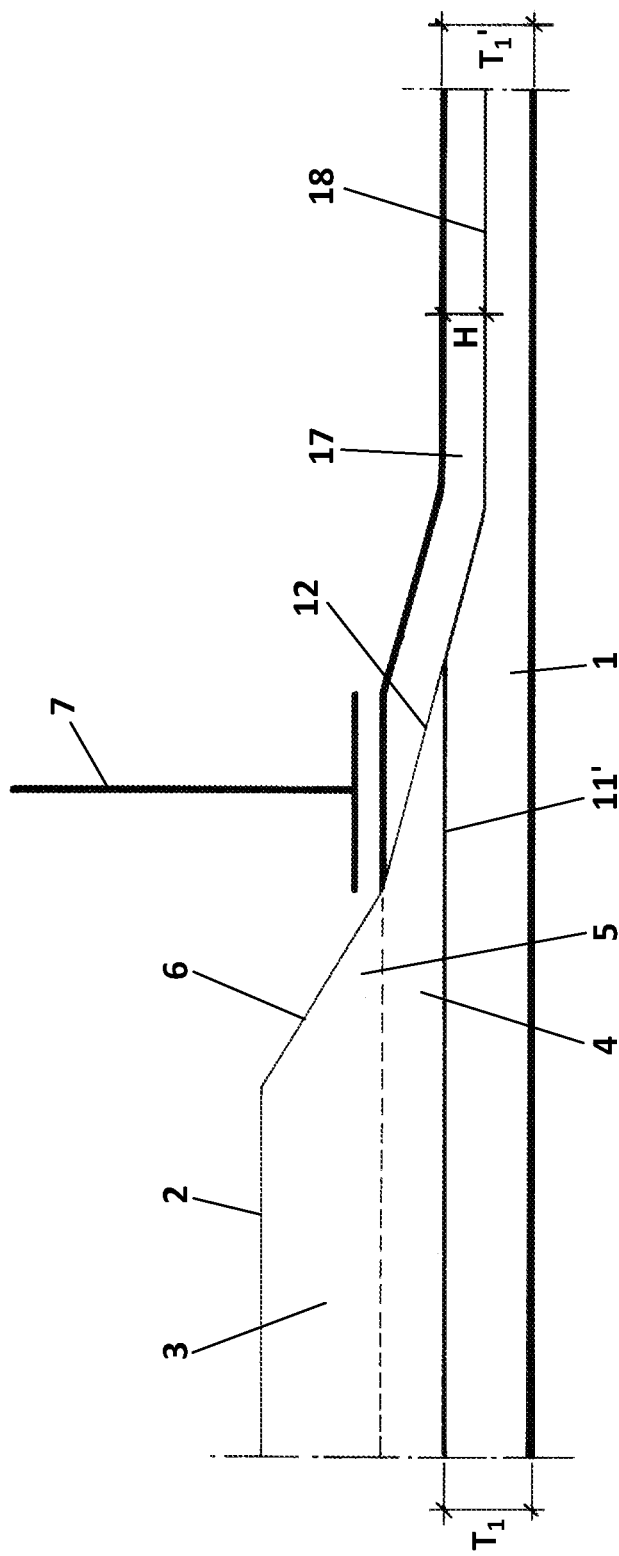
FIG. 6 shows another schematic representation of an alternative embodiment of the invention.
Figure 7:
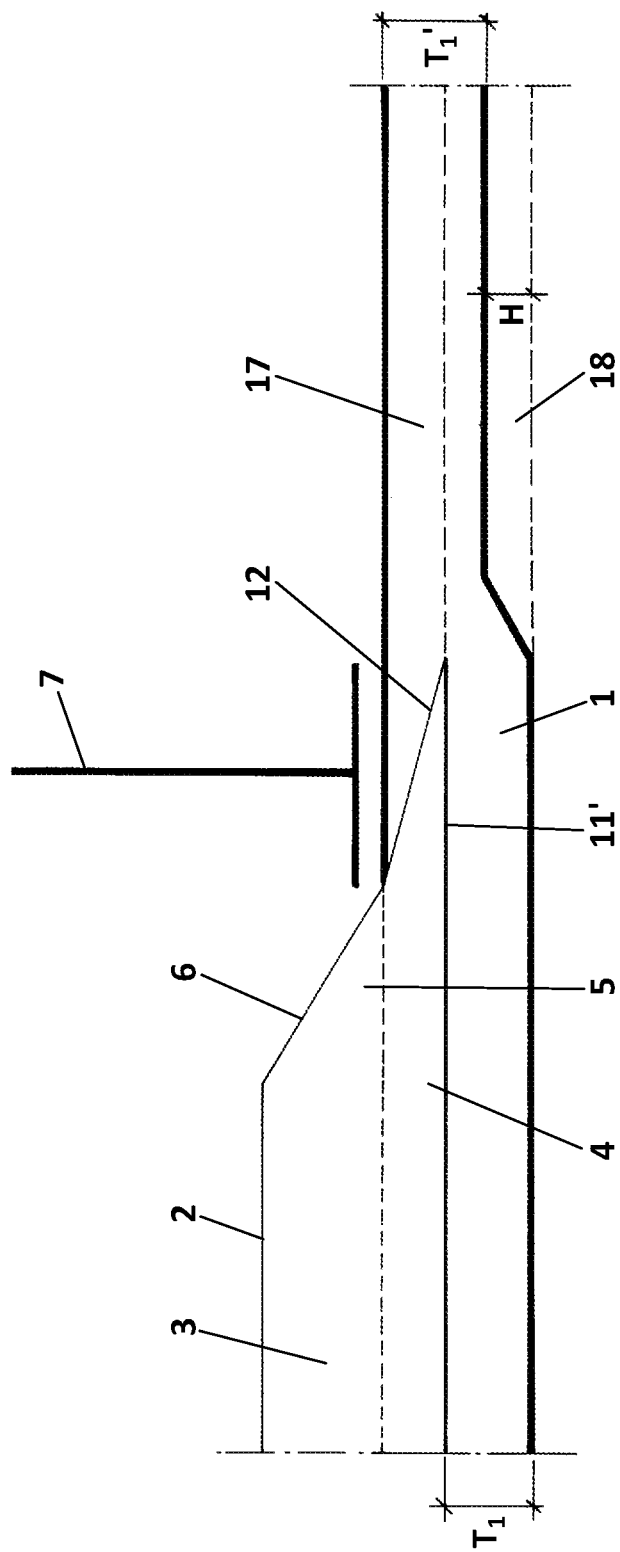
FIG. 7 shows another schematic representation of an alternative embodiment of the invention.

In the embodiment of FIG. 6, the thickness reduction (18) of the panel (1) is carried out by dropping plies from the upper surface of the panel (1), whereas in the embodiment shown in FIG. 7, the thickness reduction (18) of the panel (1) is carried out by dropping plies from the lower surface of the panel (1). In both cases the overlapping upper plies (17) are placed on the resulting top surface of the panel (1).

It should be noted in FIGS. 6 and 7, that even if the thickness of the panel (1) before and after the stringer run out (5) and its extended foot (11,) is kept constant, there is a transition section between the point where the first overlapping upper ply (17) is placed over the stringer extended foot (11), until the dropping of the plies of the panel (1) is carried out and the reduced thickness panel (18) is achieved.

The invention provides several alternatives for integrating the stringer foot within the skin panel. In the preferred embodiment of FIG. 8, a dedicated upper ply (9) having substantially the same width (W) as the extended foot (11), is applied on a lower ply (10) and on the upper surface (11') of the extended foot (11), so that an overlapping area (16) is created, the boundaries of which are the lateral edges (17,17') of the foot (4), the distal end (15) of the foot (4), and a termination line (18) of the ply (9).

Figure 9:
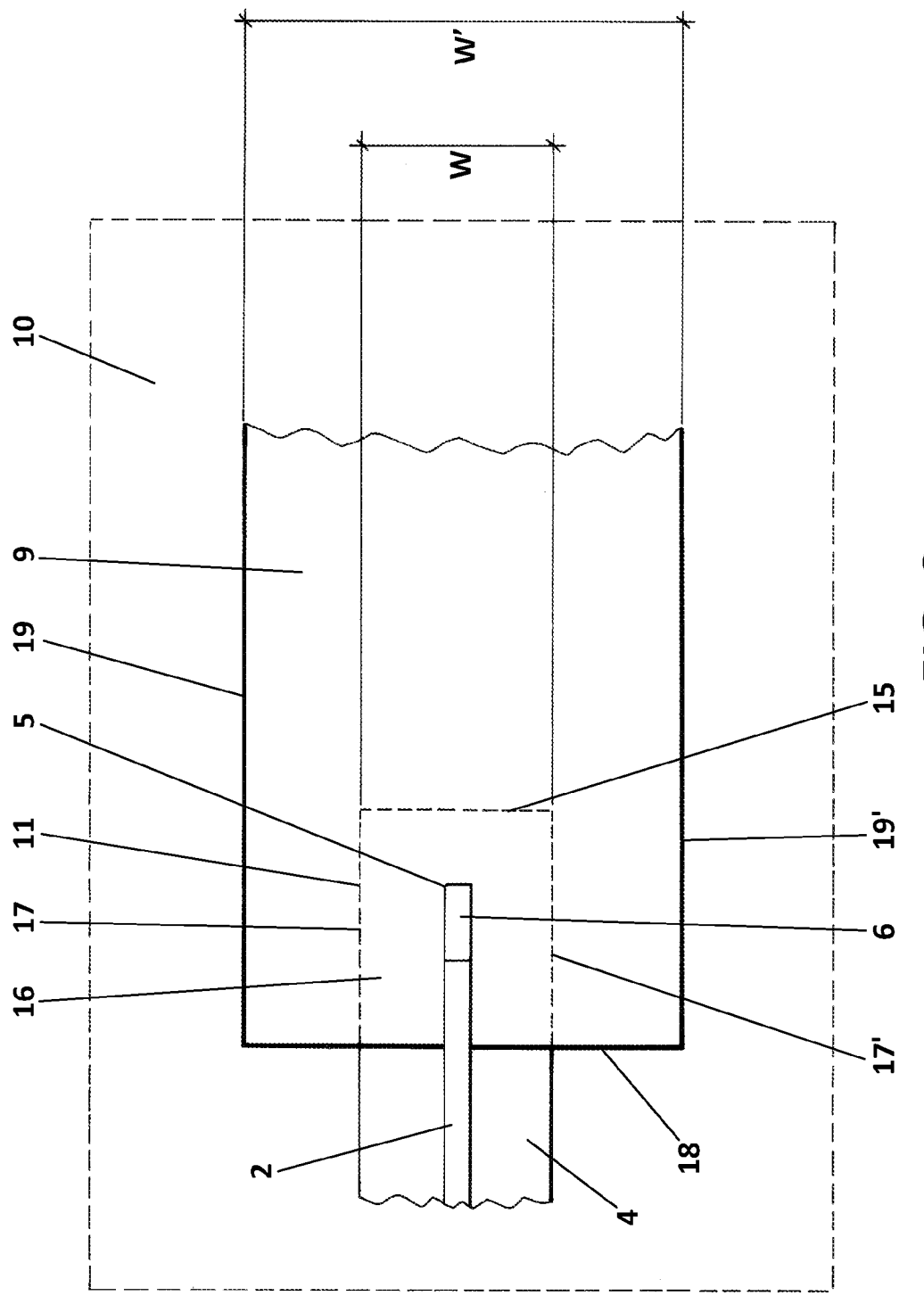
FIG. 9 is similar representation of FIG. 8 of another alternative embodiment of the invention. The perimeter of the overlapping area between the foot of the stringer and an upper ply, has been represented by a dotted line.

Alternatively, as shown in FIG. 9, the upper ply (9) is wider than the foot (4) of the stringer (W'>W), so that the lateral edges (17,17') of the foot (4), are also covered by the upper ply (9), which extends to a termination line (18), and lateral termination lines (19,19').

Figure 10:
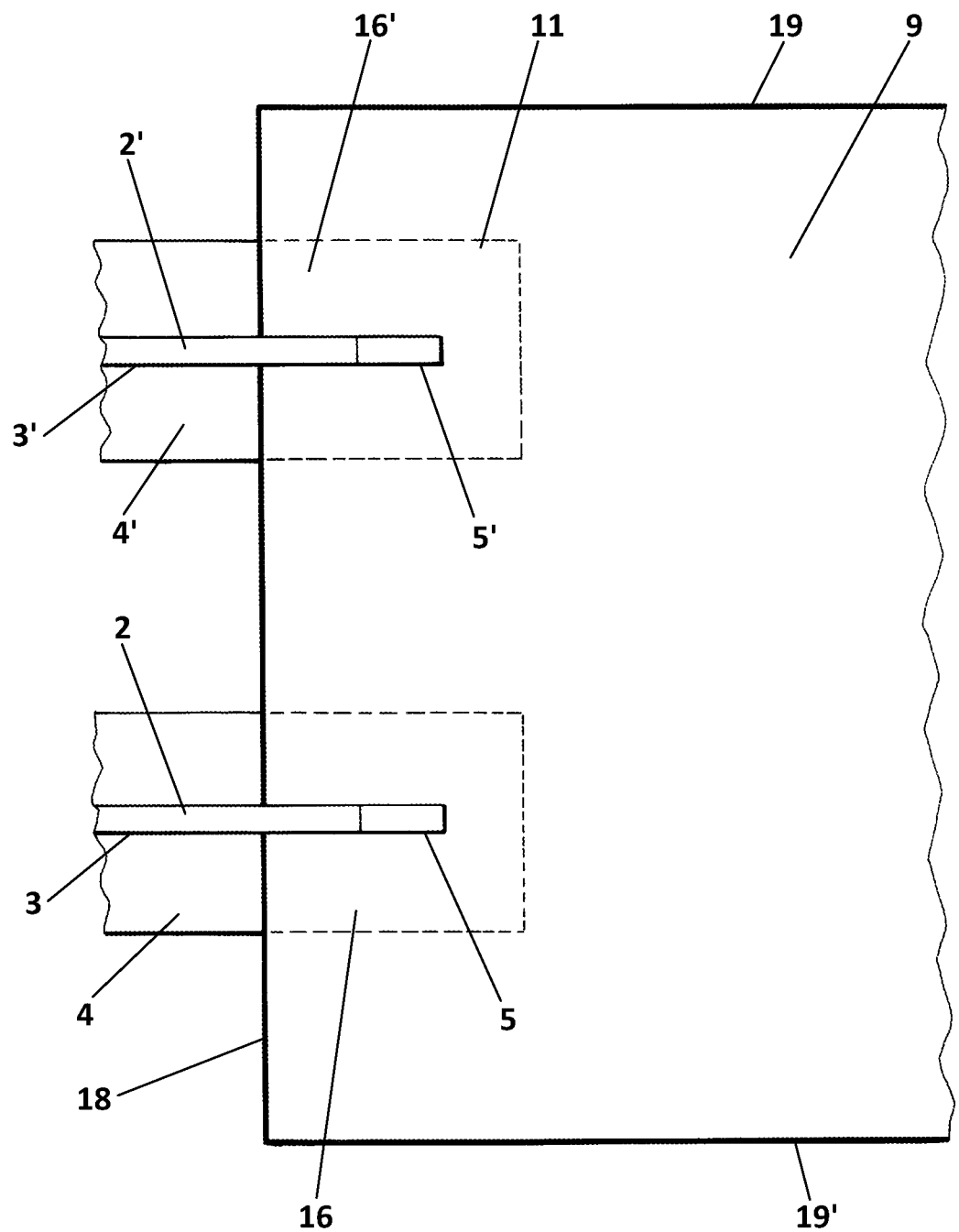
FIG. 10 is similar representation of FIG. 8 of another alternative embodiment of the invention.

Alternatively, as shown in FIG. 10, one upper ply (9) can be used in common for covering the foot of more than one stringer (3,3').

Figure 8:
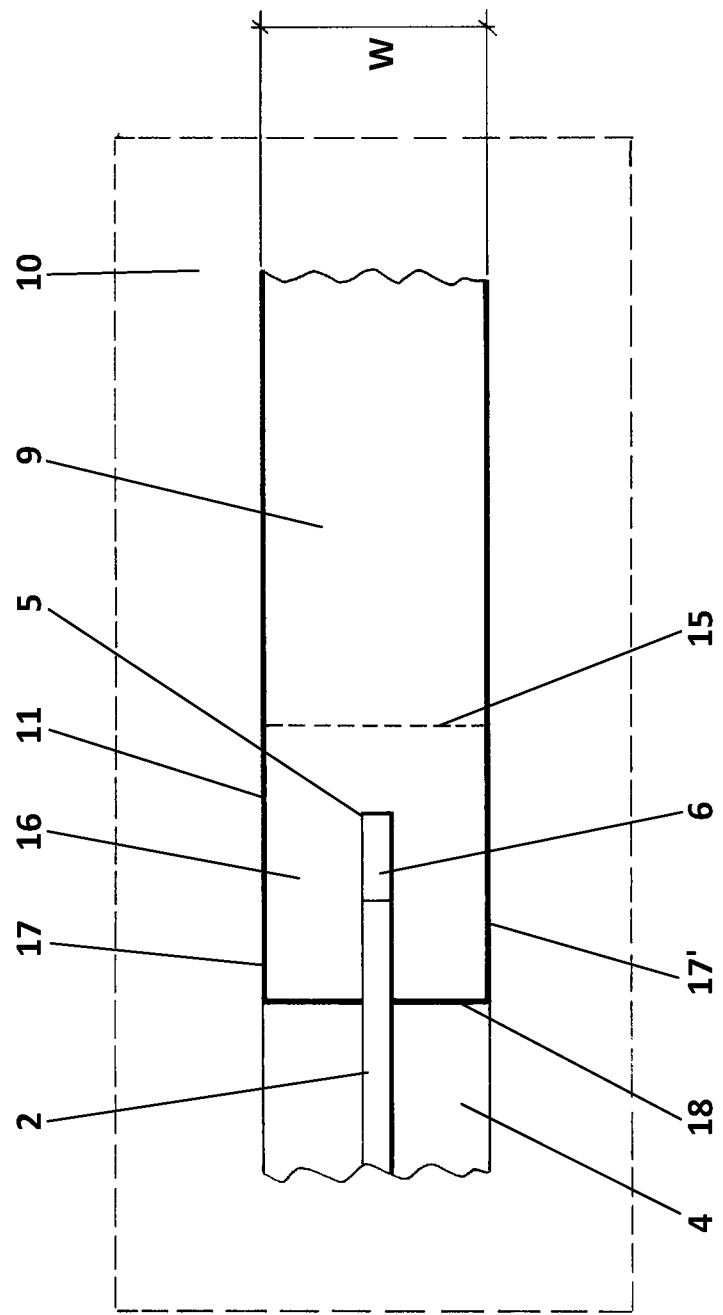
FIG. 8 is a top plan view of a schematic representation of another alternative embodiment of the invention. The end of the stringer foot has been represented by a dotted line.

In FIGS. 8-10 only one upper ply (9) is represented. However, in practical embodiments of the invention, additional plies are layed-up on top of the upper ply (9) until the skin panel is completed. This can be done by applying several dedicated plies for each individual stringer, as is the case in FIG. 8 and 7, or by applying several plies in common for several stringers as is the case in FIG. 10, or several combinations of dedicated and commons plies.

In other embodiments of the invention, the stringer may have an I-section, L-section, U-section, C-section, Ω-section, or any other suitable shape.

In a method according to the invention for manufacturing a composite structure for an aircraft, for example as the one-previously described, a plurality of stringers (3) are provided having a foot (4) and a web (2) protruding from the foot, and a run-out section (5) at one of their ends. Preferably, the stringer is a T-shaped stringer and it is manufactured by forming two L-shaped profiles. The method comprises the steps of laying up a plurality of plies of composite material to form a panel, and placing at least one of said stringers on one of the plies used to form the panel. At least one ply to form the panel is applied on a major part of the upper surface of the foot of the stringer at its run-out section, so that part of the foot of the stringer at its run-out section, is inserted between two plies of the panel.

The method of the invention provides several alternatives for obtaining such an arrangement of the skin panel and stringers with part of their foot integrated within the panel, namely:

(i) the foot of a cured stringer manufactured and cured at a previous stage, is inserted between upper and lower uncured plies. An adhesive is applied between the foot and the upper and lower uncured plies. These plies are cured at a subsequent stage, so that the stringer is co-bonded with the plies of the skin panel, (ii) an uncured stringer is inserted between upper and lower uncured plies, These plies and the stringer are cured together at a subsequent stage, so that the stringer is co-cured with the plies of the skin panel becoming an integral part of the panel, (iii) an uncured stringer is applied on cured lower plies with an adhesive layer between the stringer and lower plies, and uncured upper plies are applied on part of the upper surface of the stringer's foot. The stringer is co-bonded with the lower plies and co-cured with the upper plies.

The tapered web (6) of the run-out is typically obtained by cutting-out a triangular part of the web.

The stringer run-out assembly of the invention provides two large interface areas between the stringer and the panel so that the load transfer at the run-out between these two elements is significantly improved. The strength of the joint between the panel and a run-out section of the stringers is improved, avoiding or at least delaying the de-bonding problems of the run-out.

The invention claimed is:

1. A composite structure for an aircraft comprising a panel comprising a plurality of stacked plies of composite material; at least one stringer joined to the panel, the stringer comprising a foot, a web protruding from the foot, and a run-out section at one end; and a rib which is joined to the panel in a transverse arrangement with respect to a longitudinal axis of the stringer and also joined with the foot of the stringer at the run-out section, wherein at least part of the foot of the stringer at the run-out section is inserted between two plies of the panel and wherein the foot of the stringer at the run-out section is co-cured, co-bonded, or secondarily bonded to the plies of the panel.

2. The composite structure according to claim 1 wherein at least one ply of the panel is applied on a major part of an upper surface of the foot of the stringer at the run-out section and is directly joined therewith.

3. The composite structure according to claim 2, wherein the ply applied on an upper surface of the foot is a dedicated ply having substantially a same width as the foot.

4. The composite structure according to claim 2, wherein the ply applied on the upper surface of the foot is wider than the foot.

5. The composite structure according to claim 1, wherein the foot of the stringer comprises an extended foot which extends beyond the web, a major part of the extended foot being inserted between two plies of the panel.

6. The composite structure according to claim 1, wherein the stringer foot at the run-out section comprises a sloped portion and a stack of upper plies overlaps with the sloped portion.

7. The composite structure according to claim 1, wherein the panel comprises a section with a reduced thickness, the reduced thickness of the panel in the section being substantially similar to a thickness of a stack of upper plies.

8. The composite structure according to claim 1, wherein a shape of a cross-section of the stringer comprises a "T", "I", "L", "U", "C", or "Ω" shape.

9. The composite structure according to claim 1, wherein a plurality of plies are arranged over the foot of the stringer at the run-out section.

10. The composite structure according to claim 1, wherein the panel is a skin panel of a a torsion box, fuselage, wing, horizontal tail plane, or vertical tail plane.

11. A method for manufacturing a composite structure for an aircraft, the method comprising:
    providing at least one stringer having a foot, a web protruding from the foot, and a run-out section at one end;
    forming a panel by laying up a plurality of plies of composite material;
    joining a rib with the panel and the stringer run-out section in such a way that the rib is transversely arranged with respect to a longitudinal axis of the stringer;
    placing at least one of the stringers on one of the plies used to form the panel; and
    laying up at least one ply used to form the panel on a major part of an upper surface of the foot of the stringer at the run-out section so that at least a part of the foot of the stringer at the run-out section is inserted between two plies of the panel;
    wherein the stringer foot is co-cured, co-bonded, or secondarily bonded to the plies of the panel.

12. The method according to claim 11, wherein a foot of a cured stringer manufactured and cured at a previous stage is inserted between upper and lower uncured plies of the panel and the upper and lower uncured plies of the panel are cured at a subsequent stage so that the stringer is co-bonded with the plies of the panel.

13. The method according to claim 11, wherein an uncured stringer is inserted between upper and lower uncured plies and the upper and lower uncured plies and the uncured stringer are cured together at a subsequent stage so that the uncured stringer is co-cured with the plies of the panel, thereby becoming an integral part of the panel.

14. The method according to claim 11, wherein an uncured stringer is applied on cured lower plies and uncured upper plies are applied on part of the upper surface of the stringer foot so that the uncured stringer is co-bonded with the cured lower plies and co-cured with the upper plies.

* * * * *